Nov. 24, 1942.    J. A. GRAYSON    2,303,045
CONSTANT SPEED DRIVE
Filed Feb. 11, 1941
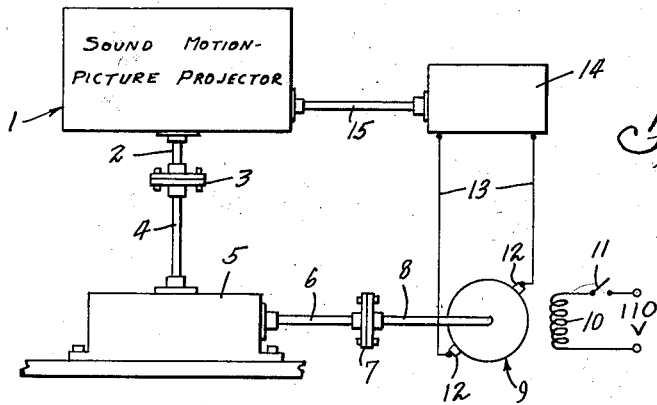
Fig. 1.
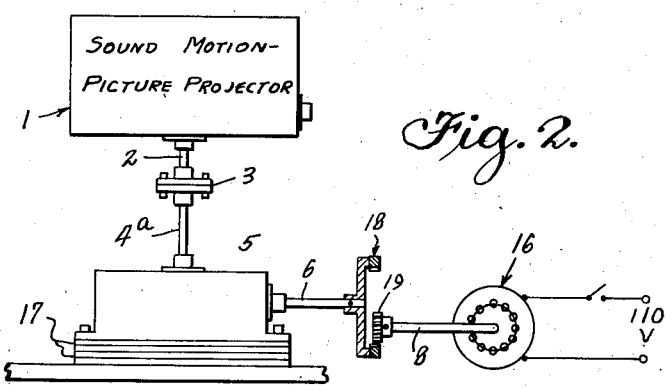
Fig. 2.
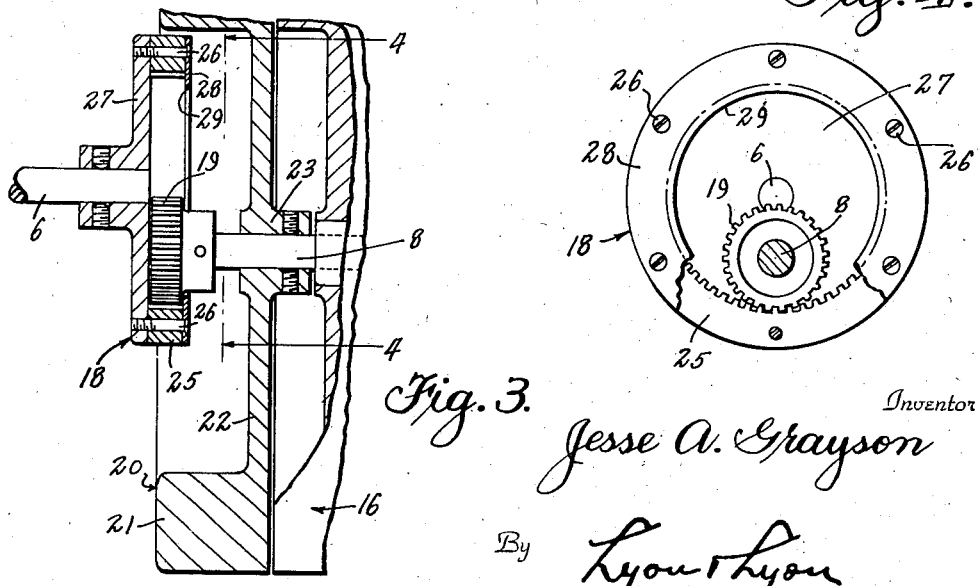
Fig. 3.
Fig. 4.
Inventor
Jesse A. Grayson
By Lyon & Lyon
Attorneys Patented Nov. 24, 1942

2,303,045

UNITED STATES PATENT OFFICE 2,303,045

CONSTANT SPEED DRIVE

Jesse A. Grayson, Los Angeles, Calif.

Application February 11, 1941, Serial No. 378,360

1 Claim. (Cl. 74—413)

This invention relates to an early form of sound motion picture projection apparatus, and particularly to the driving mechanism for driving it at a constant speed.

An object of the invention is to modify the aforementioned apparatus in a simple and practicable manner to make it more reliable and trouble-free in operation.

The invention is applicable to early models of Western Electric sound motion picture equipment in which an A. C. repulsion motor was employed as the driving element. A repulsion motor is inherently a variable speed motor having characteristics very similar to those of a direct current series motor. Therefore, in the particular apparatus referred to, the speed was governed by a complicated external governor that varied the resistance in the rotor circuit of the repulsion motor to control its speed. However this governing system was rather complicated and has not been used in the manufacture of new equipment for a number of years. The present practice is to employ an induction motor without an external governor, it having been found that an induction motor will run at sufficiently constant speed when supplied with current of constant frequency. It may well be that the complicated governors originally employed on the Western Electric equipment referred to were necessitated by the fact that at the time that apparatus was sold the commercial electric power companies did not maintain their output at such a uniform constant frequency as they now do.

A great deal of the equipment referred to, employing the complicated external governors, is still in use, and the purpose of the present invention is to provide a practicable and inexpensive method of converting this equipment to induction motor drive in accordance with present practice in the manufacture of completely new equipment.

It is a relatively simple matter to convert the repulsion motors supplied with the old equipment into repulsion-start induction-run motors. This is done by simply introducing a centrifugal device for short-circuiting the commutator bars of the repulsion motor when it gets up to speed. In fact equipment for this purpose is provided by others, and does not constitute a part of my invention. Unfortunately, however, the repulsion motors were operated at a constant speed substantially below the speed of the same motor when it is operated as an induction motor, and hence it is necessary to not only convert the motor from full repulsion operation to repulsion-start, induction-run, operation, but to change the speed ratio between the motor and the apparatus it drives. It is the method of changing the speed ratio between the motor and the apparatus it drives that constitutes the present invention, and it will be explained in the following detailed description, which refers to the drawing.

In the drawing:

Fig. 1 is a schematic diagram illustrating the prior art apparatus which is to be modified in accordance with the present invention;

Fig. 2 is a schematic diagram illustrating how the apparatus of Fig. 1 is changed in accordance with the present invention;

Fig. 3 is a detail view, partly in section, showing the actual construction of the gear reduction mechanism employed in the diagram of Fig. 2; and Fig. 4 is a view at right angles to the view of Fig. 3, taken substantially along the line IV—IV of Fig. 3.

Referring first to Fig. 1, there is indicated schematically a sound motion picture projector 1 which is driven by a shaft 2 projecting therefrom. Shaft 2 is connected by an ordinary coupling 3 to a shaft 4 which projects vertically from a speed reducing gear box 5, the latter having an input shaft 6 which is connected by an ordinary coupling 7 to the shaft 8 of a repulsion motor 9. In accordance with standard practice, the repulsion motor 9 has a field winding 10 adapted to be connected to any suitable source of alternating current through a switch 11, and has a pair of brushes 12. Ordinarily, the brushes of a repulsion motor are connected directly together, but in Fig. 1 the brushes 12 are connected by leads 13 to a speed control device 14 which has a speed responsive element therein actuated by a shaft 15 extending from the projector 1. Suffice it to say that any departure of the projector 1 from its desired speed actuates the speed control device 14 to vary resistance between the leads 13—13 in such a manner as to restore the normal desired speed of the motor.

The foregoing operation takes place when the device 14 is functioning properly. However, the equipment within the device 14 is relatively complicated and sometimes gets out of order so that it has to be serviced before the equipment will operate properly.

In accordance with the present invention, I eliminate the device 14 entirely, convert the repulsion motor 9 to an induction motor 16 (Fig. 2), and change the speed ratio between the shaft 6 and the motor shaft 8 to compensate for the higher speed of operation of the induction motor. This speed reduction is effected by substituting for the shaft 4 of Fig. 1, a shorter shaft 4a (Fig. 2), raising the speed reducing mechanism 5 by blocking 17 to offset the shaft 6 from the shaft 8, mounting an internal gear 18 on the shaft 6, and mounting a pinion 19 on the shaft 8. This is a very simple operation that can be inexpensively performed, and provides an apparatus having all the advantages of induction motor operation.

It is to be noted that the use of the internal gear 18 permits obtaining the necessary speed reduction between the shafts 8 and 6 without offsetting those shafts any great distance. Because of the arrangement of associated apparatus, it would be very difficult to raise the gear 5 a sufficient distance to permit the use of a spur gear in place of the internal gear 18. Furthermore the internal gear as shown is relatively quiet as compared to a spur gear, and does not introduce a reversal of direction.

As shown in the schematic diagram of Fig. 2 the gears 18 and 19 are spaced substantially from the motor 15. In actual practice it is feasible to locate the gearing very close to the motor 15 as shown in Fig. 3. Thus the motor has a flywheel 20 which consists of a heavy rim 21 connected by a thin flange 22 to a hub 23 on the shaft 8. Flange 22 and rim 20 define an annular space in which the gears 18 and pinion 19 are partly contained.

A further important advantage of the use of the internal gear instead of the spur gear is that it greatly facilitates lubrication. Thus, as clearly shown in Fig. 3, the internal gear 18 consists of the gear proper 25 which is secured by screws 26 to a solid connecting flange 27 secured to the shaft 6. The screws 26 also serve to secure to the opposite edge of the gear ring 25, an annular ring 28 which forms a lip 29 projecting radially inward past the gear teeth of the internal gear. Centrifugal force developed during operation tends to throw any oil present on the gears outwardly, and therefore escape of the oil is prevented by the lip 29. In contrast, spur gears tend continually to throw their oil away, and it must be continually replenished if the gears are to be kept properly lubricated so that they run quietly.

It is found that when the motor 16 is operating from 60-cycle current, the pinion 19 may have forty-nine teeth and the internal gear 18 may have seventy-two teeth. For operation on 50-cycle, the internal gear may remain the same (seventy-two teeth) and the pinion may have fifty-nine teeth.

Although for the purpose of explaining the invention a specific embodiment thereof has been described in substantial detail, it is to be understood that various changes may be made in the particular construction shown without departing from the invention, which is to be limited only to the extent set forth in the appended claim.

I claim:

In apparatus comprising a sound motion picture projector adapted to be operated at constant speed, an operating shaft for said projector extending downwardly therefrom, a gear box connected to the lower end of said shaft and having a drive shaft extending horizontally therefrom, and a governor-controlled electric repulsion motor direct-connected to said drive shaft, the method of converting such apparatus for operation of the projector at the same speed from the same electric motor operating as an induction motor at higher speed but in the same position, which comprises: converting said repulsion motor to a repulsion-start induction-run motor, elevating said gear box, shortening said vertical shaft to correspond with the new position of the gear box, and interconnecting the now offset shaft of the gear box to the motor by providing an internal gear on the gear box shaft, and a pinion meshing therewith on the motor shaft.

JESSE A. GRAYSON.